UNITED STATES PATENT OFFICE 2,306,924

HARD INFUSIBLE RESINOUS CONDENSATION PRODUCTS

Werner Zerweck, Max Schubert, and Ernst Heinrich, Frankfort-on-the-Main-Fechenheim, and Peter Pinten, Cologne-Deutz, Germany, assignors, by mesne assignments, to General Aniline & Film Corporation, New York, N. Y., a corporation of Delaware No Drawing. Application February 8, 1939, Serial No. 255,214. In Germany February 17, 1938

1 Claim. (Cl. 260—67)

Our present invention relates to resinous condensation products more particularly to those obtained by reacting on compounds containing a five-membered heterocyclic ring selected from the group consisting of the furane, pyrrole and thiazole series having two double bonds and annexed to the heterocyclic ring monovalent members of the group consisting of hydrogen, hydrocarbon amino and alcoholic radicles, but at least two hydrogen atoms, with aliphatic or aromatic aldehydes of a low molecular weight or with agents setting free such aldehydes, the reaction conditions being so strong, that infusible, opaque and insoluble resins which are extremely hard in the heat formed.

The reaction may be carried out with or without the addition of a diluent. Generally the addition of an acid agent accelerates, that of an alkaline acting agent retards the condensation reaction. According to the reactivity of the component to be condensed one may regulate the course of reaction to the desired degree by means of the addition either of acid or alkaline acting agents.

The condensation may be carried out in several steps and the soluble alkylol compound may be isolated. But in each case the conversion into the hard, infusible, insoluble and opaque final state is to be carried out while using strong conditions either by an extreme duration of time, by higher temperatures, mostly ranging above 100° C., by higher pressure or by a strong concentration of the reaction compounds or a corresponding regulation of the pH value.

Moreover other compounds which can be condensed with aldehydes such as urea and its derivatives, such as thiourea, N-substituted ureas, guanidine, dicyandiamide, amines of six- and five-membered heterocyclic ring systems, such as melamine, diaminopyrimidine, phenyl-guanazole or the corresponding hydrazino compounds, sulfonamides, mono- and polycarboxylic acid amides, anilines, phenols and the like may be added to the reaction components so that it is possible to vary the properties of the reaction products in different directions.

As suitable reaction compounds there may be mentioned for instance compounds of the furane, pyrrole, pyrazole, thiazole and imidazole series.

The present condensation products are resinous products mostly like the phenol-formaldehyde condensation products and are mostly dark opaque substances, which are infusible and insoluble in all the usual solvents, and exhibit considerable mechanical strength and chemical resistance.

Compared with the phenol-formaldehyde condensation products they are distinguished by a particular resistance to boiling water and acids and alkalies, a fact which is perhaps due to the absence of free hydroxyl groups, which are present in the molecule of the phenol formaldehyde condensation products.

The new products of the present invention may be applied for the manufacture of plastic masses, moulding passes, adhesive and gluing agents, lacquers, films and other artificial products.

Moreover, it is possible to mix the present resinous condensation product with other natural and artificial resins such as phenol-, urea, aminotriazine-, aniline-, alkyd- or ketone resins.

In order to further illustrate our invention the following examples are given the parts being by weight and all temperatures in degrees centigrade.

Example 1

A solution of 7 parts of furane of the formula:

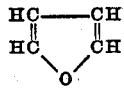

in about 70 parts of alcohol to which a little amount of hydrochloric acid is added, are mixed with 25 parts of an aqueous formaldehyde solution of 30% strength. After staying for one day at room temperature the reaction mass is evaporated at about 90° and the isolated resin is heated for some time at about 130°. In this manner a black hard resin is obtained which has a good resistance to caustic alkali solutions and acids.

Example 2

10 parts of furfuryl-alcohol of the formula:

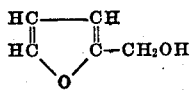

are dissolved in 15 parts of an aqueous formaldehyde solution of 30% strength. When this solution is diluted with a little amount of hydrochloric acid a turbulent reaction occurs at once while forming a black resin, which is hardened at about 130° or held for a longer time at relatively lower temperatures. The obtained resin has a very good solidity against acids and caustic alkali solutions.

Example 3

A mixture of 7 parts of furane, 10 parts of benzaldehyde, 5 parts of acetone and 0.1 part of concentrated hydrochloric acid is held for one day at room temperature. With the liquid resin thus formed wood or stones can be impregnated, the hardening occurring in some days or essentially more rapidly by the action of heat. In the same manner metallic articles may be impregnated in order to protect them against chemical ingredients. In order to obtain a spatula, mass fillers, such as quartz dust, asbestos and the like may be added.

When replacing benzaldehyde by equivalent amounts of chlorobenzaldehyde or 2.4-dimethyl-benzaldehyde very similar products are obtained.

Example 4

A mixture of 7.2 parts of phenylimidazole(2-phenylglyoxaline) of the formula:

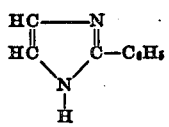

3 parts of urea, 3.5 parts of hexamethylene-tetramine and 20 parts of an aqueous formaldehyde solution of 30% strength is warmed for some hours at 90 to 100° under reflux and then evaporated to dryness. The reaction product is converted into the final state by heating for some hours at 130–140°. It is then a waterinsoluble resin.

Example 5

A mixture of 10 parts of N-phenyl-pyrazole of the formula:

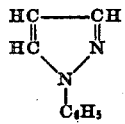

50 parts of an aqueous formaldehyde solution of 30% strength, 50 parts of alcohol and 5 parts of pyridine is evaporated to dryness at 90 to 100°. By heating some time at 130–140° a dark resin of a very good resistance to water is obtained.

Example 6

7 parts of pyrrole of the formula:

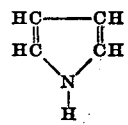

are added while cooling at about 20° to 15 parts of an aqueous formaldehyde solution of 30% strength. From this firstly clear solution a resin separates easily and quickly. The formation of the resin may be accelerated by the addition of acids. From this reaction mass the water is evaporated at about 90° and the separated deeply black resin is hardened at about 130°. In this manner a very hard resin of a very good stability against caustic alkali solution and acids is obtained.

By replacing the pyrrole used in the above example by 8 parts of N-methylpyrrole or 14 parts of N-phenylpyrrole resins of similar valuable properties are obtained.

Example 7

When shortly heating a mixture of 7 parts of pyrrole, 10 parts of hexylaldehyde, 3 parts of tricresylphosphate and 0.1 part of phosphoric acid a viscous resin is obtained which may be used as adhesive or agglutinant. By further action of heat it is rapidly transformed into the state of insolubility and hardness in the heat.

Example 8

A mixture of 80 parts N-methylpyrrol, 45 parts of phenol, 165 parts of chloral hydrate, 75 parts of a formaldehyde-solution of 30% strength and 250 parts of wood powder is stirred in a knead apparatus, which is heated at 60 to 70°, until the reaction mass becomes black. After shortly drying the mass can be moulded to moulded articles at temperatures ranging from 120 to 180°. The articles thus obtained are particularly resistant to alkaline solutions.

Example 9

A mixture of 10 parts of 2.4-dimethylpyrrol of the formula:

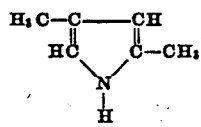

50 parts of a formaldehyde solution of 30% strength and 50 parts of alcohol is shortly warmed under reflux and the clear solution is evaporated to dryness. The reaction product is a dark and opaque resin which is insoluble in water and organic solvents.

Example 10

To a solution of 5 parts of 2.4-dimethyl-3-ethylpyrrole of the formula:

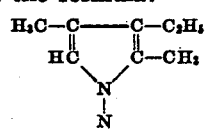

(cf. H. Fischer, Ber. vol. 56, page 612) in about 25 parts of alcohol, 25 parts of a formaldehyde solution of 30% strength and 1 part of concentrated hydrochloric acid are added and the mixture is evaporated on the water bath to dryness. In this manner a dark and opaque resin is obtained which is hardened by longer heating at 90 to 100° or a shorter heating at 120 to 130°.

Example 11

10 parts of a trimethylpyrrol mixture, obtained by acting with methyl iodide on 2.4-dimethyl-pyrrole-potassium, are dissolved in about 50 parts of alcohol, 50 parts of a formaldehyde solution of 30% strength are added and the mixture is shortly heated on the water bath under reflux. The dark red solution is evaporated at 90 to 100° and then heated some hours at 120 to 130°. The reaction product is a hard and dark resin.

Example 12

10 parts of 2-aminothiazole of the formula:

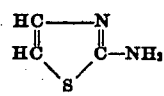

(cf. Traumann, Liebigs Annalen, vol. 249, page 36) are dissolved in about 50 parts of alcohol, 20 parts of benzaldehyde and 1.5 parts of concentrated hydrochloric acid are added and the mixture is shortly heated on the water bath under reflux. After evaporation to dryness the formed resin is heated at 120 to 130° until it becomes hard.

We claim:

A resinous condensation product obtained by reacting with formaldehyde on furfurylalcohol which product is an infusible, in the heat hard, opaque and insoluble resin, particularly resistant against acids and caustic alkali solutions.

WERNER ZERWECK.
MAX SCHUBERT.
ERNST HEINRICH.
PETER PINTEN.